US009786151B2

(12) United States Patent
Roberge

(10) Patent No.: US 9,786,151 B2
(45) Date of Patent: Oct. 10, 2017

(54) PRESSURE MEASURING DEVICE, TAP, STORAGE UNIT AND INSTALLATION COMPRISING SUCH A DEVICE

(71) Applicant: L'Air Liquide, Société Anonyme pour l'Etude et l'Exploitation des Procédés Georges Claude, Paris (FR)

(72) Inventor: Guillaume Roberge, Maubec (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 124 days.

(21) Appl. No.: 14/699,650

(22) Filed: Apr. 29, 2015

(65) Prior Publication Data

US 2015/0310724 A1   Oct. 29, 2015

(30) Foreign Application Priority Data

Apr. 29, 2014 (FR) .................................... 14 53870

(51) Int. Cl.
*G01L 19/12* (2006.01)
*G08B 21/18* (2006.01)
(Continued)

(52) U.S. Cl.
CPC ......... *G08B 21/182* (2013.01); *G01D 11/245* (2013.01); *G01L 9/008* (2013.01); *G01L 19/086* (2013.01); *G01L 19/148* (2013.01)

(58) Field of Classification Search
CPC .... G01D 11/245; G08B 21/182; G01L 9/008; G01L 19/086; G01L 19/148
(Continued)

(56) References Cited

U.S. PATENT DOCUMENTS 7,140,257 B2 * 11/2006 Henson .................. G01L 7/043
73/732
7,389,695 B2 * 6/2008 Skwara ................ G01L 19/086
73/708
(Continued)

FOREIGN PATENT DOCUMENTS

DE   10 2007 027708    12/2008
DE   10 2013 109 799  *  9/2013  ........... B67D 7/0288
(Continued)

OTHER PUBLICATIONS

French Search Report and Written Opinion for corresponding FR 1453870, Jan. 16, 2015.

*Primary Examiner* — Steven Lim
*Assistant Examiner* — Mancil Littlejohn, Jr.
(74) *Attorney, Agent, or Firm* — Elwood L. Haynes

(57) ABSTRACT

Pressure measuring device, comprising a connector extending along a longitudinal direction around a central longitudinal axis, the connector comprising a first longitudinal end intended to be fixed to an element containing pressurized gas, and a second longitudinal end provided with a diaphragm intended to be subjected to the pressure, the diaphragm comprising a pressure sensor of the piezoelectric type generating an electrical signal representative of the pressure measured, the pressure sensor being connected to an electronics board comprising electronic logic for processing the electrical signal of the sensor, the device furthermore comprising a transmission/reception antenna of the radiofrequency type fitted on the electronics board in order to receive and transmit data from and to the electronic logic, the electronics board being housed in a protective casing fixed to the connector, wherein the antenna is located on or adjacent to an axis passing through the central longitudinal axis of the connector.

10 Claims, 3 Drawing Sheets

(51) Int. Cl.
  *G01L 9/00*   (2006.01)
  *G01L 19/08*   (2006.01)
  *G01L 19/14*   (2006.01)
  *G01D 11/24*   (2006.01)

(58) Field of Classification Search
  USPC .......................................................... 340/626
  See application file for complete search history.

(56) References Cited

U.S. PATENT DOCUMENTS

| | | | |
|---|---|---|---|
| 8,667,849 B2 * | 3/2014 | Sato | ........................ G01L 9/008 361/283.4 |
| 2004/0047119 A1 * | 3/2004 | Wortman | ............. H05K 7/1418 361/679.01 |
| 2010/0131213 A1 * | 5/2010 | Bleys | ..................... G01L 19/086 702/50 |
| 2016/0194193 A1 * | 7/2016 | Szeteli | ................. B67D 7/0288 141/94 |

FOREIGN PATENT DOCUMENTS

| FR | 2 901 876 | 12/2007 |
|---|---|---|
| FR | 2 915 799 | 11/2008 |
| WO | WO 2004 053450 | 6/2004 |
| WO | WO 2005 063512 | 7/2005 |
| WO | WO 2006 074417 | 7/2006 |

\* cited by examiner

PRESSURE MEASURING DEVICE, TAP, STORAGE UNIT AND INSTALLATION COMPRISING SUCH A DEVICE

BACKGROUND

The present invention relates to a pressure measuring device.

The invention relates more particularly to a pressure measuring device, in particular for measuring the pressure of a gas such as hydrogen, comprising a connector extending along a longitudinal direction around a central longitudinal axis, the connector comprising a first longitudinal end intended to be fixed to an element containing pressurized gas, and a second longitudinal end provided with a diaphragm intended to be subjected to the pressure, the diaphragm comprising a pressure sensor of the piezoelectric type generating an electrical signal representative of the pressure measured, the said pressure sensor being connected to an electronics board comprising electronic logic for processing the electrical signal of the sensor, the device furthermore comprising a transmission/reception antenna of the radiofrequency type fitted on the said electronics board in order to receive and transmit data from and to the electronic logic, the electronics board being housed in a protective casing fixed to the connector.

The invention more particularly relates to a remotely interrogatable pressure measuring device.

Document FR2901876A1 describes in particular an example of a remotely interrogatable pressure measuring device for a pressurized fluid bottle.

Pressure measuring devices need to have a compact structure, an energy consumption which is as low as possible and a good ability to transmit and optionally receive data to and from a reading component. This is particularly desirable when the measuring component is attached to a pressurized gas bottle tap.

SUMMARY

It is an object of the present invention to overcome all or some of the above-described drawbacks of the prior art.

To this end, the device according to the invention, in other regards corresponding to the generic definition thereof given by the preamble above, is essentially characterized in that the antenna is located on or adjacent to an axis passing through the central longitudinal axis of the connector.

Furthermore, embodiments of the invention may have one or more of the following characteristics:
  the antenna is located at a distance of between zero and five millimeters from an axis passing through the central longitudinal axis of the connector,
  along the longitudinal direction parallel to the central longitudinal axis, the antenna is located opposite the first end of the connector,
  the antenna is located level with the border of a first end of the electronics board, adjacent to a wall forming a base of the casing,
  the electronics board is housed in a cavity of the casing, the casing comprising at least one groove for guiding and holding at least one edge of the board,
  the casing consists of plastic,
  the outer surface of the casing is of light colour, in particular white,
  the device comprises a temperature sensor connected to the electronic logic, the electronic logic being configured in order to correct the possible error of the pressure measurement of the sensor with respect to the actual pressure, as a function of the temperature measured by the temperature sensor and at least one correction coefficient,
  the electronic logic is configured in order to correct a possible error of the pressure measurement as a function of the temperature variation measured with respect to a temperature reference T0 determined according to a formula of the type: $Pr(T)=Pm(T) \cdot a \cdot DT+b$, in which $Pr(T)$ is the actual pressure in bars at the temperature T, $Pm(T)$ is the pressure in bars measured by the pressure sensor at the temperature T, DT being the temperature variation T−To measured with respect to standard temperature conditions To determined in degrees Celsius, a and b being known coefficients determined for the sensor by means of at least one calibration measurement of the sensor at a determined temperature, a being a dimensionless correction coefficient and b being a correction coefficient expressed in bars,
  the electronic logic is configured in order to modify the at least one correction coefficient in response to a control signal received by the antenna,
  along a direction parallel to the central longitudinal axis of the connector, the antenna is located level with a first end of the electronics board, this first end of the electronics board being located opposite a second end, adjacent to the connector, of the electronics board,
  the electronics board and the connector are arranged in series along a direction parallel to the central longitudinal axis of the connector,
  the electronics board lies in a plane parallel to the central longitudinal axis of the connector,
  the casing is fixed to the connector by at least one from: elastic deformation, adhesive bonding, screwing,
  the antenna is of the type with bidirectional transmission/reception at a frequency of preferably between 50 and 300 kHz, and in particular between 120 and 130 kHz,
  the electronic logic is configured in order to automatically transmit a wireless response signal via the antenna on reception of a received signal,
  the measuring device may be used in an installation comprising a pressurized gas storage unit, the measuring device being attached to a tap connected to a pressurized gas storage unit, the installation comprising a gas extraction/filling component selectively connectable to the tap, the extraction/filling component comprising an antenna which, when the gas extraction/filling component is connected to the tap, lies adjacent to the antenna of the measuring device,
  in the connected position of the extraction/filling component on the tap, the antenna of the measuring device and the antenna of the gas extraction/filling component are aligned along the central longitudinal axis of the connector and separated by a distance preferably lying between one and five millimeters,
  the reception by the antenna of the extraction/filling component of a signal sent by the antenna of the measuring device forms a detector of a correct connected position of the extraction/filling component on the tap,
  the electronic logic comprises a data acquisition and processing system and a memory, in particular a microprocessor or microcontroller,
  the electronic logic is configured in order to determine and store at least one of the following information:

identification information of a storage unit, measured pressure variation data, pressure information representative of a leak, the first end of the connector comprises a threaded or screw-tapped portion formed around the central longitudinal axis.

The invention may also relate to a tap for a pressurized gas storage unit comprising a pressure measuring device according to any one of the characteristics above or below.

The invention may also relate to a pressurized gas storage unit, in particular a bottle or a set of bottles, comprising such a tap.

The invention may also relate to an installation comprising a pressurized gas storage unit provided with a tap and a gas extraction and/or filling component selectively connectable to the tap, the pressurized gas storage unit being in accordance with the characteristics above or below, the extraction/filling component comprising an antenna which, when the gas extraction/filling component is connected to the tap, lies adjacent to the antenna of the measuring device.

The invention may also relate to an installation comprising a temperature sensor connected to the electronic logic of the measuring device, the said electronic logic being configured in order to correct the possible error of the pressure measurement of the sensor with respect to the actual pressure as a function of the temperature measured by the temperature sensor and at least one correction coefficient, the electronic logic being configured in order to modify the at least one correction coefficient in response to a control signal sent by the antenna of the extraction/filling component to the antenna of the pressure measuring device.

The invention may also relate to an installation comprising a pressurized gas storage unit provided with a measuring device fitted on a tap connected to the pressurized gas storage unit, the pressure measuring device comprising a connector comprising a first end intended for it to be fitted and a second end provided with a diaphragm intended to be subjected to the pressure, the diaphragm comprising a pressure sensor of the piezoelectric type generating an electrical measurement signal, the said pressure sensor being connected to an electronics board comprising electronic logic for processing the electrical signal of the sensor, the device furthermore comprising a transmission/reception antenna of the radiofrequency type fitted on the said electronics board in order to receive and transmit data from and to the electronic logic, the electronics board being housed in a protective casing fixed to the connector, the installation comprising a gas extraction/filling component selectively connectable to the tap, the extraction/filling component comprising an antenna which, when the gas extraction/filling component is connected to the tap, lies adjacent to the antenna of the measuring device, the installation comprising a temperature sensor connected to the electronic logic, the electronic logic being configured in order to correct the possible error of the pressure measurement of the sensor with respect to the actual pressure as a function of the temperature measured by the temperature sensor and at least one correction coefficient, the electronic logic being configured in order to modify the at least one correction coefficient in response to the reception, by the antenna of the measuring device, of a control signal transmitted by the antenna of the gas extraction/filling component when it is connected to the tap.

The invention may also relate to any alternative device or method comprising any combination of the characteristics above or below.

BRIEF DESCRIPTION OF THE DRAWINGS

Other features and advantages will become apparent on reading the following description, given with reference to the figures, in which.

DESCRIPTION OF PREFERRED EMBODIMENTS

Figure 1:
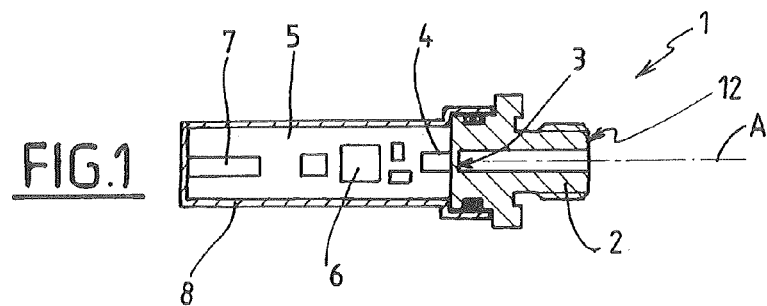
FIG. 1 represents a schematic and partial view in section illustrating a possible example of a structure of a measuring device according to the invention.
Figure 2:
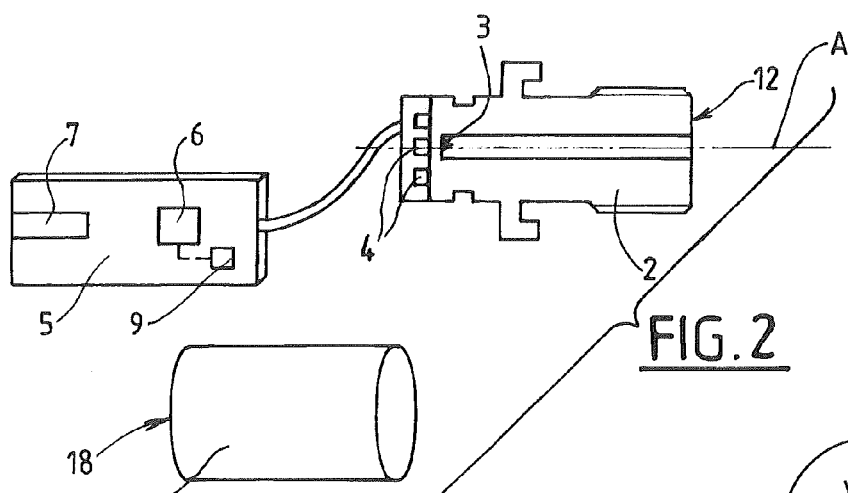
FIG. 2 represents a schematic view, partially in section, illustrating the measuring device of FIG. 1 in a disassembled state.
Figure 3:
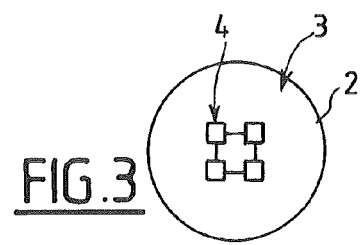
FIG. 3 represents a front view of a detail of the device of FIG. 1 representing an example of a structure of a pressure sensor.
Figure 5:
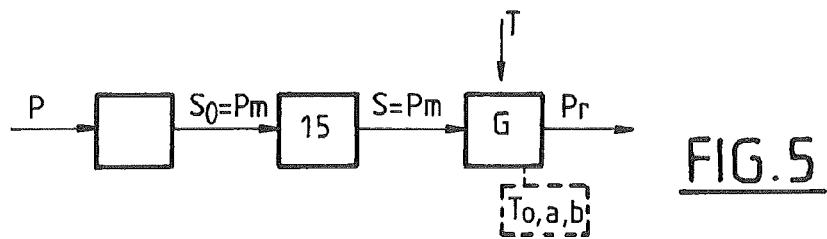

The pressure measuring device 1 represented in FIGS. 1 to 3 comprises a connector 2 extending along a longitudinal direction around a central longitudinal axis A. The connector 2 comprises a first longitudinal end 12, which is for example threaded, intended to be fixed to an element containing pressurized gas, for example a tap of a pressurized gas bottle. The central longitudinal axis A is, for example, the axis of revolution of the screw thread.

The connector 2 comprises a second longitudinal end provided with a diaphragm 3 intended to be subjected to the pressure to be measured and comprising a pressure sensor 4. In the conventional way, the connector 2 may have a tubular shape defining a blind hole (the bottom of the hole consisting of the diaphragm 3 and the internal part of the tube being centred on the central longitudinal axis A) in order to allow passage of the gas, putting the diaphragm 3 in fluidic communication with the first end 12. For example, the connector 2 consists of at least one of the following machined materials: stainless steel (in particular of the type 316L), a steel, or any other suitable material.

The thickness of the diaphragm 3 (for example between 1.5 and 2 mm) is selected as a function of the pressure level to be measured (and also depends on the precision/sensitivity/maximum drift desired over time). In the conventional way, the pressure of the gas which enters the connector and comes in contact with the diaphragm 3 induces a deformation of the latter. This deformation is detected by the sensor 4, preferably of the piezoelectric type, which generates in response an electrical signal representative of the deformation measured, and therefore of the pressure measured.

The pressure sensor 4 is connected, for example in a wired fashion (for example four wires) to an electronics board 5 comprising electronic logic 6 for acquisition and processing of data, and in particular of the electrical signal of the sensor 4. The electronic logic 6 comprises, for example, at least a microprocessor and a memory.

The device 1 furthermore comprises a transmission/reception antenna 7 of the radiofrequency type (for example of "RFID" technology) fitted on the said electronics board 5 in order to receive and transmit data from/to the electronic logic 6. The antenna 7 is, in particular, intended to remotely transmit information relating to the pressure value measured by the sensor 4.

The device 1 preferably does not have a display, the reading of the pressure measurement being carried out by means of a system for wireless communication with the antenna 7.

The electronics board 5 is housed in a protective casing 8 fixed to the connector 2, for example by adhesive bonding, screwing or snap-fastening. Preferably, the casing 8 is assembled in a leaktight fashion or in order to limit the entry of moisture into it.

According to an advantageous feature, in the fitted position (FIG. 1), the antenna 7 is located on or adjacent to the axis passing through the central longitudinal axis A of the connector 4. That is to say, the antenna 7 is aligned with the central longitudinal axis A of the connector 2. In the case in which the device 1 has a cylindrical overall shape, this means that the antenna 7 is located on or as close as possible to the symmetry axis of the cylinder, that is to say the axis passing through the centre of its circular cross sections.

Furthermore, preferably, the antenna 7 is located at a longitudinal end opposite the first end of the connector 2. For example, the antenna 7 is located level with an edge of the first end of the electronics board 5 and adjacent to a wall 18 forming a base of the casing 8 (cf. FIG. 1). That is to say, the antenna 7 is separated from the exterior of the device 1 only by the thickness of the casing 8 (0.1 to 5 mm), optionally plus a few tenths of a millimeter or a few millimeters.

That is to say, the antenna 7 is located at the end of the device along the longitudinal direction A and centrally in a cross section transverse to the longitudinal axis A.

This architecture makes it possible to impart a high-quality impedance to the antenna 7. Preferably, the electronics board 5 (its earth plane) and its components are adapted to this placement of the antenna 7 in order to further improve the quality factor of the antenna 7. The shape, the inductance and the orientation of the antenna 7 are thus adapted to the casing 8 in order to allow optimal wireless communication with another antenna of an external component.

Positioning the antenna 7 centrally and at one end of the device 1 allows precise positioning of the antenna 7 regardless of the angular position of the connector 2 (the connector 2 is, for example, screwed). Thus, the antenna 7 lies in a region as close as possible to the central axis A (to within the thickness of the board 5) and as close as possible to the outer surface of the device 1 (to within the thickness of the casing 8).

Figure 4:
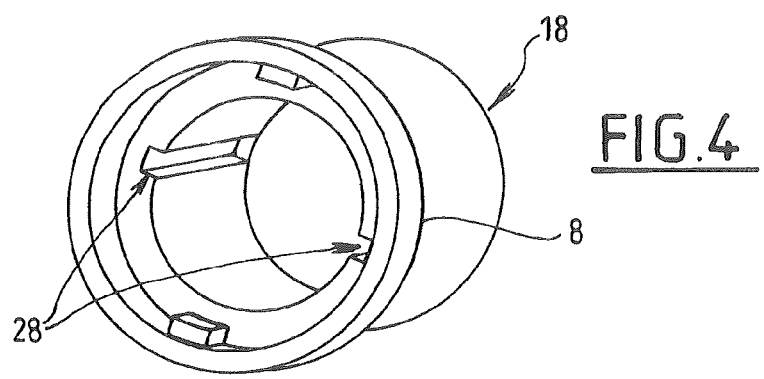
FIG. 4 represents a perspective view of a detail of the device of FIG. 1 representing an example of a casing of the measuring device, FIG. 5 schematically and partially illustrates an example of the operation of the measuring sensor of the device of FIG. 1.

Preferably, and as can be seen in FIG. 4, the electronics board 5 may be housed in a cavity of the casing 8. Furthermore, the casing 8 may comprise at least one groove, and preferably two grooves 28 for guiding and holding two opposite edges of the board 5. That is to say, the electronics board 5 may be slid into the casing 8 in the manner of a drawer or a slide rail.

The device 1 preferably does not have its own energy sources or backup (battery, solar sensor or the like) but receives its energy via the antenna 7 (inductive supply). The structure below makes it possible to optimize the efficiency of the antenna 7 and therefore the electricity consumption of the device.

The machining of the thickness of the diaphragm 3 is subject to manufacturing tolerances. The sensitivity (gain) of the pressure sensor 4 varies as a function of this thickness. It is therefore preferable to calibrate each pressure sensor 4 independently.

As can be seen schematically in FIG. 3, the pressure sensor 4 may comprise a device of the Wheatstone bridge type arranged on the back of the diaphragm 3 (at the centre where the deformation takes place).

At the periphery of the diaphragm 3 (where there is no deformation, or little deformation), it is known to place resistors dedicated to adjustment of the zero value (offset) and of the compensation thereof as a function of the temperature. Nevertheless, an effect of the ambient temperature on the pressure measurement carried out by the sensor 4 may remain. The compensation obtained conventionally by resistors is valid only for a limited range of temperatures (typically between −10° C. and +40° C.). In certain cases, furthermore, this correction may be nonlinear.

Preferably, and as represented in FIG. 3, the device 1 does not comprise a resistor/resistors for temperature compensation of the zero value (offset).

Rather, the device 1 comprises a temperature sensor 9 (arranged on the electronics board 5) connected to the electronic logic 6. Furthermore, the electronic logic 6 is configured (programmed) in order to correct the possible error of the pressure measurement Pm of the sensor 4 with respect to the actual pressure Pr by means of a law for correction as a function of the temperature T measured by the temperature sensor 9 and at least one correction coefficient a, b predetermined according to a preestablished law and stored in the electronic logic 6.

The electronic logic 6 is configured in order to compensate for the pressure measurement of the sensor 4 as a function of the measured temperature T according to a law for compensation of the pressure as a function of the temperature, programmed into the electronic logic 6. This law is preferably linear (linear variation of the pressure as a function of temperature according to a first-order equation). This law may be determined by carrying out an output measurement of the sensor 4 for two temperature points in order to define the value of this parameter for compensating for the effect of the temperature on the pressure measurement.

As illustrated schematically in FIG. 4, the pressure P of the gas on the diaphragm 3 (on the side of the first longitudinal end 12) creates a deformation of the diaphragm 3 which generates an electrical signal S0 of the pressure sensor 4 with a relatively low value (for example of the order of one millivolt), corresponding to the pressure value Pm measured. This signal S0 is amplified on the electronics board by means of an amplifier 15, then the resulting amplified analogue signal S is converted into a digital value by an analogue/digital converter preferably integrated in the electronic logic 6. The electronic logic 6 also compensates for the pressure measurement Pm of the sensor 4 as a function of the measured temperature T by means of a law for compensation of the pressure as a function of temperature, programmed into the electronic logic 6, in order finally to give an actual pressure value Pr. For example, the electronic logic 9 is configured in order to correct the possible error of the pressure measurement Pm as a function of the temperature variation DT=T−T0 measured with respect to a temperature reference To determined according to a formula of the type: $Pr(T)=Pm(T) \cdot a \cdot DT+b$, in which Pr(T) is the actual pressure in bars (corrected) at the temperature (T), Pm(T) is the pressure in bars measured by the pressure sensor 4 at the temperature T, DT being the temperature variation T−To measured with respect to standard temperature conditions To determined in degrees Celsius (° C.), a and b being known coefficients determined for the sensor by means of at least one calibration measurement of the sensor 4 at a determined temperature, a being a dimensionless correction coefficient and b being a correction coefficient expressed in bars.

Advantageously, the electronic logic 6 may be configured in order to modify at least one correction coefficient a, b or the correction law in response to a control signal received via the antenna 7. That is to say, the device, and in particular the correction of the measurement of the pressure sensor 4, may be recalibrated if necessary, for example each time the device returns to a filling centre. For example, the pressure values measured by the sensor may be compared with known pressure values in a filling centre, acting as a reference. The zero value (offset) as well as the shape (slope) of the temperature correction may thus be reprogrammed in the electronic logic 6 (coefficients a and b). This may be very useful when the pressure sensor 4 has a tendency to drift over time (zero drift).

In the same way, a law for compensation for the effect of the temperature on the pressure measurement Pm may be provided in order also to compensate for the gain of the sensor 4 as a function of the temperature T measured. Preferably, however, this functionality is not integrated in the electronic logic 6, because the effect of the temperature T on the gain is deemed negligible.

The casing 8 preferably consists of plastic, although it could also be composed of any other suitable material. Also preferably, at least the external surface of the casing 8 is of light colour, in particular white. This makes it possible to limit the heating of the sensor 4 in the event of exposure to the sun, and therefore to limit the influence of the temperature on the pressure measurement.

Figure 6:
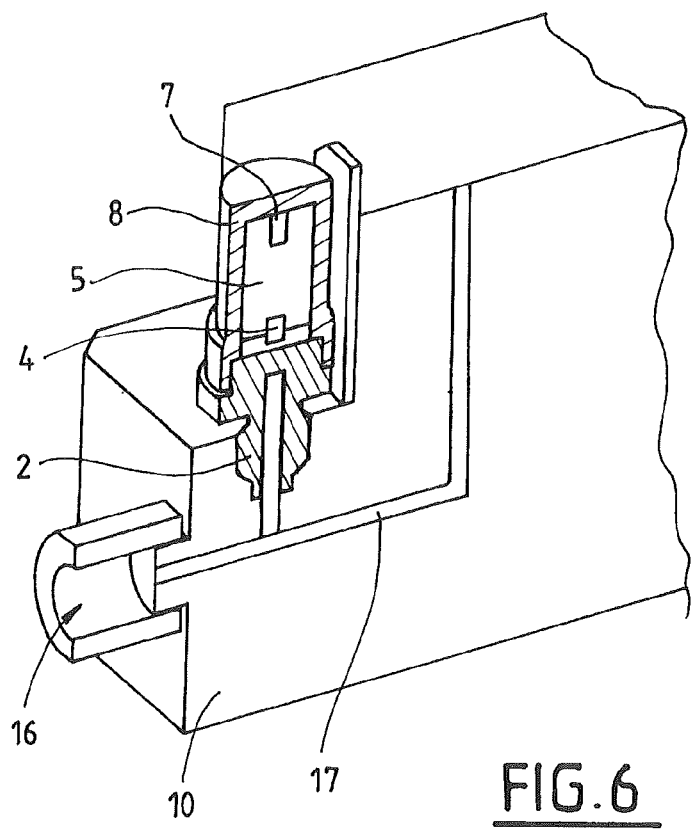
FIG. 6 represents a schematic and partial view in section illustrating an installation comprising a measuring device fitted on a pressurized gas bottle tap.

As illustrated schematically and partially in FIG. 6, the pressure measuring device 1 may be fitted on a tap 10 comprising an end intended to be connected to a pressurized gas container. The device 1 measures the pressure in a fluidic circuit 17 communicating with the pressurized container.

Figure 7:
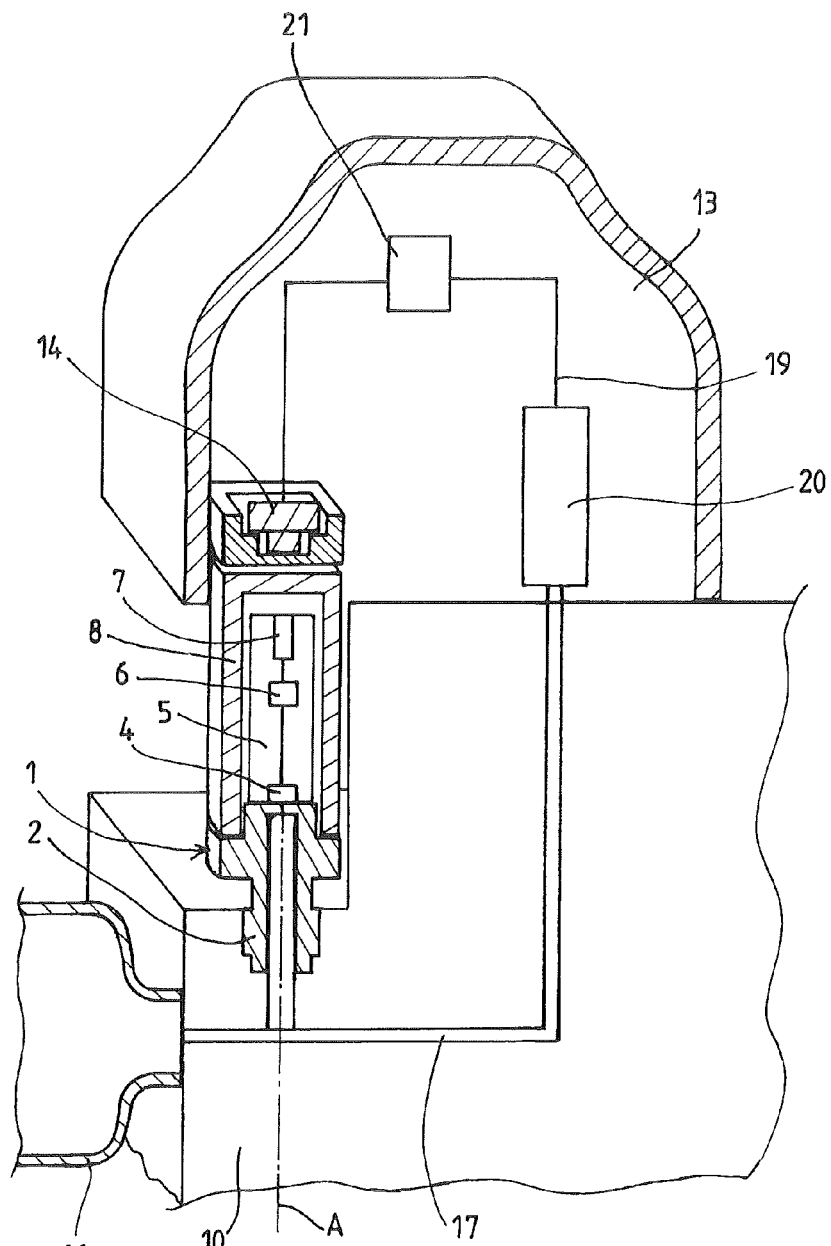
FIG. 7 represents a schematic and partial view in section illustrating the installation of FIG. 6, in which a gas filling/extraction component cooperates with the tap and the pressure measuring device.

FIG. 7 schematically and partially illustrates an installation for filling a pressurized gas storage unit 11 comprising a tap 2 provided with such a pressure measuring device 1.

The installation comprises a gas extraction/filling component 13 selectively connectable mechanically to the tap 2. The extraction/filling component 13 comprises an internal fluid circuit 19 intended to be connected to the circuit 17 of the tap 2. The extraction/filling component 13 preferably comprises a component 20 such as a mobile valve actuator for opening a valve in the circuit 17 of the tap 10.

The extraction/filling component 13 comprises an antenna 14, in particular of the RFID type, which, when the gas extraction/filling component 13 is connected to the tap 2, lies adjacent to the antenna 7 of the measuring device 1 (particularly in extension of or in line with the antenna 7).

In the connected position of the extraction/filling component 13 on the tap 2, the antenna 7 of the measuring device 1 and the antenna 14 of the gas extraction/filling component 13 are aligned along the central longitudinal axis A of the connector 2 and separated by a distance lying between, for example, 1 and 5 mm.

The structure of the measuring device 1, and in particular the position of its antenna 7, makes it possible to arrange a matching antenna 14 reliably in front of it for data exchange and energy transfer. The position of the antenna 7 of the measuring device 1 transversely to the central longitudinal axis A is independent of the angular position of the connector 2 on the tap 10. The position of the antenna 7 of the measuring device 1 along the central longitudinal axis A allows a matching antenna 14 to come as close as possible in order to ensure effective inductive coupling.

Preferably, the antenna 14 of the filling port is connected to electronic data acquisition and processing logic 21.

The electronic logic 21 of the filling port 13 may, in particular, be configured in order to transmit and receive data of the pressure measuring device 1 via the inductive coupling of the antennas 7, 14.

For example, the electronic logic 21 of the filling port 13 may receive or transfer (modify) at least one of the data below:

an identification number of the device 1 or of the pressure sensor 4, the nature or identification of the tap 10 and/or of the storage unit 10 connected to the tap 2, in particular the volume of the storage unit 10, the service pressure of the storage unit 11, its storage capacity (in $Nm^3$), the maximum filling or extraction rate supported by the storage unit (in $m^3$ per hour), the minimum operating pressure of the storage unit in bars (particularly in the case in which the tap 10 comprises a residual pressure valve (RPV)), the number of storage units 11 associated with the tap 2, the maximum pressure measured during a determined period (for example the last twelve months), the minimum and maximum temperatures measured by the temperature sensor 9 during a determined period, the warnings generated by the installation because of a risk situation.

The electronic logic 21 of the measuring device 1 may be configured in order to automatically transmit a wireless response signal via the antenna 7 on reception of a signal received by the antenna 7 (coming from the antenna 14 of a filling port 13). That is to say, the magnetic coupling between the two antennas 7, 14 makes it possible to form a detector of a connected position between these two elements 13, 1.

For example, when the extraction port 13 is connected to a tap 10, the detection of the device 1 may automatically initiate a leak test of the tap or of another part of the circuit, or any other operation, or allow opening of the valve, for example by the actuation (displacement) of the valve actuator.

Preferably, the measuring device 1 is electrically supplied and woken (turned on) by the energy provided by the antenna 14 of the filling port 13.

Likewise, the absence of a signal between the antennas 7, 14 makes it possible to detect physical disconnection between the port 13 and the tap 2. For example, after a certain number of attempts (for example three reading attempts during one to two seconds) by the antenna 14 of the port to read the presence of the antenna 7 of the measuring device 1, the filling port 13 may instigate closure of one or more valves and/or the transmission of corresponding information. Particularly in the case in which an installation simultaneously uses a plurality of storage units 11, each provided with a measuring device 1, in the event of loss of communication with a device 1 the installation may instigate closure of a valve for isolation of the storage unit and open the valve of another storage unit 11.

Furthermore, each time a new storage unit 11 is connected to the installation (for example when the identifier of the measuring device 1 which is read changes), the installation may be configured to automatically carry out a leak test of the circuit in question which has just been connected.

For example, a high-pressure valve may be opened in order to release gas from the storage unit 11 into a collecting line, then the valve is closed and the pressure in the line is measured. In the case of a relatively small pressure drop (less than a determined safety threshold), the installation approves the storage unit and allows extraction.

The measuring device thus makes it possible to transmit information of pressure within a storage unit 11. This makes it possible to monitor the pressure of the storage units 11 in order to carry out logistics. To this end, the extraction port 13 may continuously read the pressure levels measured by the pressure sensors 4 and may transmit the information to a control centre.

Depending on the pressure levels detected in relation to the pressure levels expected according to the state of one or more valves, the installation may thus detect and record and transmit faults which are detected, in particular:

a leak of the storage unit 11, a malfunction of a residual pressure valve, the loss of a sensor, etc., incorrect filling, an extraction rate which is too high (and with the risk of causing blistering of a composite container), an output pressure which is abnormally low even though the isolation valve is open, a pressure downstream of a pressure reducer which is too high, a problem of the pressure reducer (or a fault of the pressure sensor).

All or some of the initial parameters stored in the electronic logic 6 of the measuring device 1 may be programmed and reprogrammed wirelessly via the antenna 7.

The magnetic coupling between the two antennas 7, 14 may form a connected-position detector in order to allow the opening of a valve on this condition. Otherwise, a valve of the tap may be automatically closed.

For example, this makes it possible to know that a filling port is properly connected to the tap. If the two antennas are out of range (too far away or poorly positioned), the connection is poor and the opening of an isolation valve is prohibited because it is dangerous.

For example, the installation comprises a mobile component for opening a valve of the tap of the storage unit, and the extraction and/or filling component comprises electronic logic connected to the mobile opening component and to the pressure measuring device, the said electronic logic being configured in order to allow opening of the valve of the tap by means of the mobile opening component only when the antenna of the measuring device is adjacent to the antenna of the extraction component, that is to say when the antenna of the device receives a determined signal from the antenna of the extraction component.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A pressure measuring device for measuring the pressure of a gas, comprising:

a connector extending along a longitudinal direction around a central longitudinal axis, the connector comprising a first longitudinal end configured to be fixed to an element containing pressurized gas, and a second longitudinal end provided with a diaphragm configured to be subjected to the pressure, the diaphragm comprising a pressure sensor of the piezoelectric type generating an electrical signal representative of the pressure measured, said pressure sensor being connected to an electronics board comprising electronic logic for processing the electrical signal of the sensor, and a transmission/reception antenna of the radiofrequency type fitted on said electronics board in order to receive and transmit data from and to the electronic logic, the electronics board being housed in a protective casing fixed to the connector, wherein the antenna is located on or adjacent to an axis passing through the central longitudinal axis of the connector, at a distance of between zero and five millimeters from an axis passing through the central longitudinal axis of the connector, and in that the antenna is located level with the border of a first end of the electronics board, adjacent to a wall forming a base of the casing, further comprising a temperature sensor connected to the electronic logic, and in that the electronic logic is configured in order to correct the possible error of the pressure measurement (Pm) of the sensor with respect to the actual pressure (Pr), as a function of the temperature (T) measured by the temperature sensor and at least one correction coefficient (a, b), wherein the electronic logic is configured in order to correct a possible error of the pressure measurement (Pm) as a function of the temperature variation (DT=T−T0) measured with respect to a temperature reference T determined according to a formula of the type: Pr(T)=Pm(T)·a·DT+b, in which Pr(T) is the actual pressure in bars at the temperature (T), Pm(T) is the pressure in bars measured by the pressure sensor at the temperature T, DT being the temperature variation T−To measured with respect to standard temperature conditions To determined in degrees Celsius, a and b being known coefficients determined for the sensor by means of at least one calibration measurement of the sensor at a determined temperature, a being a dimensionless correction coefficient and b being a correction coefficient expressed in bars.

2. The device of claim 1, wherein the antenna is of the type with bidirectional transmission/reception at a frequency of between 50 and 300 kHz.

3. The device of claim 2, wherein the electronic logic is configured in order to automatically transmit a wireless response signal via the antenna on reception of a received signal.

4. The device of claim 1, wherein, along the longitudinal direction parallel to the central longitudinal axis, the antenna is located opposite the first end of the connector.

5. The device of claim 1, wherein the electronics board is housed in a cavity of the casing, the casing comprising at least one groove for guiding and holding at least one edge of the board.

6. The device of claim 1, wherein the casing consists of plastic.

7. The device of claim 1, wherein the outer surface of the casing is white.

8. The device of claim 1, wherein the electronic logic is configured in order to modify the at least one correction coefficient (a, b) in response to a control signal received by the antenna.

9. An installation comprising a pressurized gas storage unit provided with a tap and a gas extraction and/or filling component selectively connectable to the tap, wherein the pressurized gas storage unit comprising a tap for a pressurized gas storage unit, comprising a pressure measuring device, comprising:
- a connector extending along a longitudinal direction around a central longitudinal axis, the connector comprising a first longitudinal end configured to be fixed to an element containing pressurized gas, and a second longitudinal end provided with a diaphragm configured to be subjected to the pressure, the diaphragm comprising a pressure sensor of the piezoelectric type generating an electrical signal representative of the pressure measured, said pressure sensor being connected to an electronics board comprising electronic logic for processing the electrical signal of the sensor, and
- a transmission/reception antenna of the radiofrequency type fitted on said electronics board in order to receive and transmit data from and to the electronic logic, the electronics board being housed in a protective casing fixed to the connector, wherein the antenna is located on or adjacent to an axis passing through the central longitudinal axis of the connector, at a distance of between zero and five millimeters from an axis passing through the central longitudinal axis of the connector, and in that the antenna is located level with the border of a first end of the electronics board, adjacent to a wall forming a base of the casing, the extraction/filling component comprising an antenna which, when the gas extraction/filling component is connected to the tap, lies adjacent to the antenna of the measuring device, further comprising a mobile component for opening a valve of the tap of the storage unit, and in that the extraction and/or filling component comprises electronic logic connected to the mobile opening component and to the pressure measuring device, the said electronic logic being configured in order to allow opening of the valve of the tap by means of the mobile opening component only when the antenna of the measuring device is adjacent to the antenna of the extraction component, that is to say when the antenna of the device receives a determined signal from the antenna of the extraction component.

10. The installation of claim 9, further comprising a temperature sensor connected to the electronic logic of the measuring device, the said electronic logic being configured in order to correct the possible error of the pressure measurement of the sensor with respect to the actual pressure as a function of the temperature measured by the temperature sensor and at least one correction coefficient (a, b), wherein the electronic logic is configured in order to modify the at least one correction coefficient (a, b) in response to a control signal sent by the antenna of the extraction/filling component to the antenna of the pressure measuring device.

* * * * *